United States Patent
Chen et al.

(10) Patent No.: US 10,439,680 B2
(45) Date of Patent: Oct. 8, 2019

(54) COORDINATED BEAMFORMING METHOD AND DEVICE

(71) Applicant: DATANG MOBILE COMMUNICATIONS EQUIPMENT CO., LTD., Beijing (CN)

(72) Inventors: Xianguo Chen, Beijing (CN); Yiming Jiang, Beijing (CN)

(73) Assignee: DATANG MOBILE COMMUNICATIONS EQUIPMENT CO. LTD., Beijing (CN)

( * ) Notice: Subject to any disclaimer, the term of this patent is extended or adjusted under 35 U.S.C. 154(b) by 23 days.

(21) Appl. No.: 15/573,838

(22) PCT Filed: Jan. 25, 2016

(86) PCT No.: PCT/CN2016/071990
§ 371 (c)(1),
(2) Date: Nov. 14, 2017

(87) PCT Pub. No.: WO2016/180054
PCT Pub. Date: Nov. 17, 2016

(65) Prior Publication Data
US 2018/0262237 A1    Sep. 13, 2018

(30) Foreign Application Priority Data
May 14, 2015   (CN) .......................... 2015 1 0246663

(51) Int. Cl.
H04B 7/024    (2017.01)
H04B 7/06     (2006.01)
H04B 7/08     (2006.01)

(52) U.S. Cl.
CPC .......... *H04B 7/024* (2013.01); *H04B 7/0632* (2013.01); *H04B 7/0617* (2013.01); *H04B 7/086* (2013.01)

(58) Field of Classification Search
CPC .... H04B 7/024; H04B 7/0617; H04B 7/0632; H04B 7/086; H04B 7/0452; H04B 7/619;
(Continued)

(56) References Cited

U.S. PATENT DOCUMENTS

2011/0098072 A1* 4/2011 Kim .................. H04L 5/0032
                                                            455/509
2011/0255526 A1* 10/2011 Kaneko .................. H04B 7/022
                                                            370/338
(Continued)

FOREIGN PATENT DOCUMENTS

CN    102870340 A    1/2013
CN    103281792 A    9/2013
(Continued)

OTHER PUBLICATIONS

Jiwoong et al., "Method and apparatus for determining a cooperative terminal", Jan. 9, 2013, CN, CN102870340A, English machine language translation. (Year: 2013).*

(Continued)

*Primary Examiner* — Paul H Masur
*Assistant Examiner* — Michael K Phillips
(74) *Attorney, Agent, or Firm* — Kilpatrick Townsend & Stockton LLP

(57) ABSTRACT

A coordinated beamforming method and device. The method includes: upon receipt of coordination request from multiple coordinated multi-point user equipments (CoMP UE), determining a target CoMP UE from multiple CoMP UEs; calculating a channel correlation value between the target CoMP UE and each candidate coordinated UE in a coordinated cell; determining, on basis of channel correlation value between the target CoMP UE and each candidate coordinated UE, a target coordinated UE; if the channel correlation value between target coordinated UE and the (Continued)

target CoMP UE is lower than a preset lower channel correlation threshold, then not performing beamforming orthogonalization adjustment on the target coordinated UE; and if the channel correlation value between target coordinated UE and target CoMP UE is greater than or equal to the preset lower channel correlation threshold, then performing beamforming orthogonalization adjustment on target coordinated UE. The present application can greatly reduce the probability of a performance decline of the target coordinated UE.

15 Claims, 3 Drawing Sheets

(58) Field of Classification Search
CPC .... H04B 17/309; H04W 88/08; H04W 72/04; H04W 88/02; H04W 16/28; H04W 72/046; H04W 72/085; H04L 1/0026; H04L 5/0035; H04L 25/0204; H04L 5/006
See application file for complete search history.

(56) References Cited

U.S. PATENT DOCUMENTS

| | | |
|---|---|---|
| 2012/0202431 A1 | 8/2012 | Hawryluck et al. |
| 2013/0034038 A1 | 2/2013 | Jang et al. |
| 2014/0018071 A1* | 1/2014 | Mennerich ............ H04W 48/08 455/434 |
| 2015/0098444 A1* | 4/2015 | Marzetta ............... H04L 5/0073 370/331 |
| 2017/0064676 A1* | 3/2017 | Lee .......................... H04B 7/04 |
| 2017/0104568 A1* | 4/2017 | Nasiri Khormuji . H04B 7/0413 |
| 2018/0076937 A1* | 3/2018 | Nasiri Khormuji .. H04L 5/0048 |

FOREIGN PATENT DOCUMENTS

| | | |
|---|---|---|
| CN | 104993857 A | 10/2015 |
| KR | 20120049732 A | 5/2012 |
| WO | 2011157104 A1 | 12/2011 |

OTHER PUBLICATIONS

Dong, "Coordinating beamforming method and device", Sep. 4, 2013, CN, CN103281792A, English machine language translation. (Year: 2013).*

Chen et al., "Coordinated beamforming method and device", Oct. 21, 2015, CN, CN104993857A, English machine language translation. (Year: 2015).*

Motorola: "Spatial Correlation Feedback to Support LTE-A MU-MIMO and CoMP: System Operation and Performance Results"; 3GPP Draft; RI-092221 UE Feedback (Revised From 091936), 3rd Generation Partnership Project (3GPP), Mobile Competence Centre ; 650, Route Des Lucioles ; F-06921 Sophia-Antipolis Cedex ; France, No. San Francisco, USA; XP050339645; May 7, 2009, 12 pages.

* cited by examiner

COORDINATED BEAMFORMING METHOD AND DEVICE

This application is a US National Stage of International Application No. PCT/CN2016/071990, filed on Jan. 25, 2016, designating the United States, and claiming the benefit of Chinese Patent Application No. 201510246663.6, filed with the Chinese Patent Office on May 14, 2015, which is hereby incorporated by reference in its entirety.

FIELD

The application relates to the technical field of LTE data processing, and particularly to a coordinated beamforming method and a coordinated beamforming device.

BACKGROUND

In a Long Term Evolution (LTE) system, Orthogonal Frequency Division Multiplexing (OFDM) is adopted to modulate the high-speed data to each orthogonal subchannel, so mutual interference between channels can be effectively reduced. However, OFDM is only applied to the user equipments in the current cell. Owing to frequency-division multiplexing between cells, interference exists between user equipments of different cells, thus result in a poor performance near the edge of a cell, and so interference between cells becomes main interference in an LTE system.

In order to solve the problem of poor performance near the edge of a cell, the 3rd Generation Partnership Project (3GPP) introduces Inter Cell Interference Coordination (ICIC) technology and Coordinated Multiple Points (CoMP) technology in version R8 specification and version R11 specification to improve the performance of user equipments near a cell edge. Where CoMP technology can provide service to user equipments near a cell edge through coordination between a plurality of adjacent base stations or nodes, so as to reduce the co-channel interference to the user equipments near a cell edge and improve the service quality to the user equipments near a cell edge. According to the different degrees of sharing of user data and channel state information, CoMP technology is further divided into Joint-Processing (JP) technology and Coordinated Scheduling/Beamforming (CS/CB) technology.

The basic principle of coordinated beamforming (CB) transmission technology is that: for the User Equipments (UEs) with poor signal quality in the cell edge, beamforming of Physical Downlink Shared Channel (PDSCH) needs to be finished with the joint participation of a coordinated cell. Specifically, scheduling information and channel state information of a CoMP UE and a coordinated UE is interacted between a serving cell and a coordinated cell, the CoMP UE and coordinated UE can adjust their respective shaped-beam based on the information to make the shaped-beams orthogonal as much as possible, thereby reducing the mutual beam interference.

There are mainly two schemes to realize coordinated beamforming in the prior art as follows.

SLNR scheme: adopting Signal-to-Leakage-and-Noise Ratio (SLNR) algorithm. A CoMP UE and a coordinated UE determine their respective beamforming vector with the maximum value of ratio of their respective useful signal strength to the interference signal strength to other UEs as the criterion, so as to guarantee the minimum interference to other UEs on the premise of ensuring the performance of the CoMP UE and the coordinated UE, thereby reducing the co-channel interference to the UEs near a cell edge. Theory of the algorithm can maximize the performance of CB, but the complexity of computation is very high, the beamforming vector of the CoMP UE and the coordinated UE needs to be adjusted, and the serving cell and coordinated cell need to exchange scheduling information and channel state information mutually, which can cause excess transmission delay; therefore, the scheme is seldom adopted in product realization.

Beamforming orthogonalization adjustment scheme: the beamforming vector of the CoMP UE is not adjusted; the beamforming vector of the coordinated UE is adjusted based on the scheduling information and channel state information of the CoMP UE, and null steering of the beam is directed at the channel of the CoMP UE, thereby reducing the interference to the CoMP UE. The scheme is the product realization scheme mainly adopted by mainstream equipment manufacturers, but the major problem is that after adjustment of beamforming vector of the coordinated UE, energy and direction of the shaped-beam are not optimal, so the performance of the coordinated UE may decline.

In addition, for a scenario that a plurality of CoMP UEs request for coordination from the same coordinated cell, the conflict that the plurality of CoMP UEs request coordination simultaneously may occur. No effective solutions have been provided in the prior art.

SUMMARY

In view of the aforementioned problem, embodiments of the application are proposed to provide a coordinated beamforming method and a coordinated beamforming device to solve the problem or at least partially solve the problem.

In order to solve the aforementioned problem, an embodiment of the application provides a coordinated beamforming method, where the method includes:

determining a target Coordinated Multiple Points (CoMP) User Equipment (UE) from a plurality of CoMP UEs upon receipt of coordination requests from the plurality of CoMP UEs;

computing a channel correlation value between the target CoMP UE and each candidate coordinated UE in a coordinated cell;

determining a target coordinated UE according to the channel correlation value between the target CoMP UE and each candidate coordinated UE;

making no beamforming orthogonalization adjustment to the target coordinated UE if the channel correlation value between the target coordinated UE and the target CoMP UE is smaller than a preset lower channel correlation threshold; and making beamforming orthogonalization adjustment to the target coordinated UE if the channel correlation value between the target coordinated UE and the target CoMP UE is greater than or equal to the preset lower channel correlation threshold.

Preferably, the method further includes:

rejecting coordination requests from other CoMP UEs except the target CoMP UE after the target CoMP UE is determined.

Preferably, the coordination requests include Channel Quality Indicator (CQI) data of the CoMP UEs. The determining the target CoMP UE from a plurality of CoMP UEs upon receipt of a coordination request from the plurality of CoMP UEs includes:

comparing the CQI data of the plurality of CoMP UEs and taking a CoMP UE with a minimum CQI as the target CoMP UE.

Preferably, the computing the channel correlation value between the target CoMP UE and each candidate coordinated UE in the coordinated cell includes:

acquiring channel information of the target CoMP UE, and channel information of each candidate coordinated UE in the coordinated cell; and computing the channel correlation value between the target CoMP UE and each candidate coordinated UE according to the channel information of the target CoMP UE and the channel information of each candidate coordinated UE.

Preferably, the determining the target coordinated UE according to the channel correlation value between the target CoMP UE and each candidate coordinated UE includes:

acquiring a first Physical Resource Block (PRB) amount assigned to the candidate coordinated UE and CQI data of the candidate coordinated UE;

acquiring a second PRB amount requested by the target CoMP UE;

computing a difference value between the first PRB amount and the second PRB amount; and taking a candidate coordinated UE meeting the following three conditions at the same time in the coordinated cell as the target coordinated UE:

(1) Channel correlation value of the target CoMP UE and the candidate coordinated UE is smaller than or equal to a preset upper channel correlation threshold;

(2) CQI data of the candidate coordinated UE is greater than or equal to a preset CQI threshold;

(3) The difference value between the first PRB amount and the second PRB amount is smaller than a preset PRB difference threshold.

Preferably, the determining the target coordinated UE according to the channel correlation value between the target CoMP UE and each candidate coordinated UE further includes:

if the number of the target coordinated UEs is more than two, choosing a target coordinated UE with a minimum channel correlation value from the more than two target coordinated UEs as a final target coordinated UE.

An embodiment of the application discloses a coordinated beamforming device; where the device includes:

a target CoMP UE determining module configured to determine a target CoMP UE from a plurality of CoMP UEs upon receipt of coordination requests from the plurality of CoMP UEs;

a channel correlation value computing module configured to compute the channel correlation value between the target CoMP UE and each candidate coordinated UE in a coordinated cell;

a target coordinated UE determining module configured to determine a target coordinated UE according to the channel correlation value between the target CoMP UE and each candidate coordinated UE;

a first determination module configured to make no beamforming orthogonalization adjustment to the target coordinated UE if the channel correlation value between the target coordinated UE and the target CoMP UE is smaller than a preset lower channel correlation threshold; and a second determination module configured to make beamforming orthogonalization adjustment to the target coordinated UE if the channel correlation value between the target coordinated UE and the target CoMP UE is greater than or equal to the preset lower channel correlation threshold.

Preferably, the device further includes:

a request rejection module configured to reject coordination requests from other CoMP UEs except the target CoMP UE after the target CoMP UE is determined.

Preferably, the coordination requests include the Channel Quality Indicator (CQI) data of the CoMP UEs. The target CoMP UE determining module includes:

a CoMP UE selection module configured to compare the CQI value of the plurality of CoMP UEs and take a CoMP UE with a minimum CQI as the target CoMP UE.

Preferably, the channel correlation value computing module includes:

a channel information acquiring module configured to acquire channel information of the target CoMP UE, and channel information of each candidate coordinated UE in the coordinated cell; and a computing module configured to compute the channel correlation value between the target CoMP UE and each candidate coordinated UE according to the channel information of the target CoMP UE and the channel information of each candidate coordinated UE.

Preferably, the target coordinated UE determining module includes:

a candidate coordinated UE data acquiring module configured to acquire a first Physical Resource Block (PRB) amount assigned to the candidate coordinated UE and CQI data of the candidate coordinated UE;

a target CoMP UE data acquiring module configured to acquire a second PRB amount requested by the target CoMP UE;

a difference value computing module configured to compute a difference value between the first PRB amount and the second PRB amount; and a determination module configured to take a candidate coordinated UE meeting the following three conditions at the same time in a coordinated cell as the target coordinated UE:

(1) Channel correlation value of the target CoMP UE and the candidate coordinated UE is smaller than or equal to a preset upper channel correlation threshold;

(2) CQI data of the candidate coordinated UE is greater than or equal to a preset CQI threshold;

(3) The difference value between the first PRB amount and the second PRB amount is smaller than a preset PRB difference threshold.

Preferably, the target coordinated UE determining module further configured to:

choose a target coordinated UE with a minimum channel correlation value from the more than two target coordinated UEs as a final target coordinated UE if the number of the target coordinated UEs is more than two.

An embodiment of the application further discloses a computer readable storage medium storing programs used to perform the aforementioned method.

The embodiment of the application has the following advantages.

First, in the embodiments of the application, the coordinated cell can determine one CoMP UE as the target CoMP UE from a plurality of CoMP UEs when receiving the coordination requests of the plurality of CoMP UEs, thereby avoiding the conflict caused by the simultaneous requests for coordination by a plurality of CoMP UEs.

Second, after the target coordinated UE is determined in the embodiments of the application, whether beamforming orthogonalization adjustment needs to be made the target coordinated UE is determined according to the channel correlation value between the target coordinated UE and the target CoMP UE; if the channel correlation value between the target coordinated UE and the target CoMP UE is smaller than the preset lower channel correlation threshold, no beamforming orthogonalization adjustment will be made to the target coordinated UE, so that performance of the target coordinated UE will not decline, thereby greatly reducing the probability for performance reduction of the target coordinated UE.

Third, in the embodiments of the application, when a coordinated cell determines more than two target coordinated UEs from a plurality of candidate coordinated UEs, a second determination can be made according to the channel correlation value between more than two target coordinated UEs and the target CoMP UE, and the target coordinated UE with the minimum channel correlation value will be selected from more than two target coordinated UEs as the final target coordinated UE, thereby improving the accuracy of determination of the target coordinated UE.

DETAILED DESCRIPTION OF THE EMBODIMENTS

In order to make the objects, characteristics and advantages of the application more apparent and understandable, further expatiations will be given according to the drawings and embodiments.

One of the core concepts of the embodiments of the application consists in that when a plurality of CoMP UEs request for coordination from the same coordinated cell, a target CoMP UE will be selected from the plurality of CoMP UEs, and the coordination requests of the other CoMP UEs except the target CoMP UE will be rejected; after the target CoMP UE is determined, a target coordinated UE will be determined according to a channel correlation value between the target CoMP UE and each candidate coordinated UE, and no beamforming orthogonalization adjustment will be made to the target coordinated UE if the channel correlation value between the target CoMP UE and the target coordinated UE is smaller than a preset lower channel correlation threshold; otherwise, beamforming orthogonalization adjustment will be made to the target coordinated UE, thereby ensuring the performance of the target coordinated UE will not decline, which reduces the probability for performance reduction of the target coordinated UE.

Figure 1:
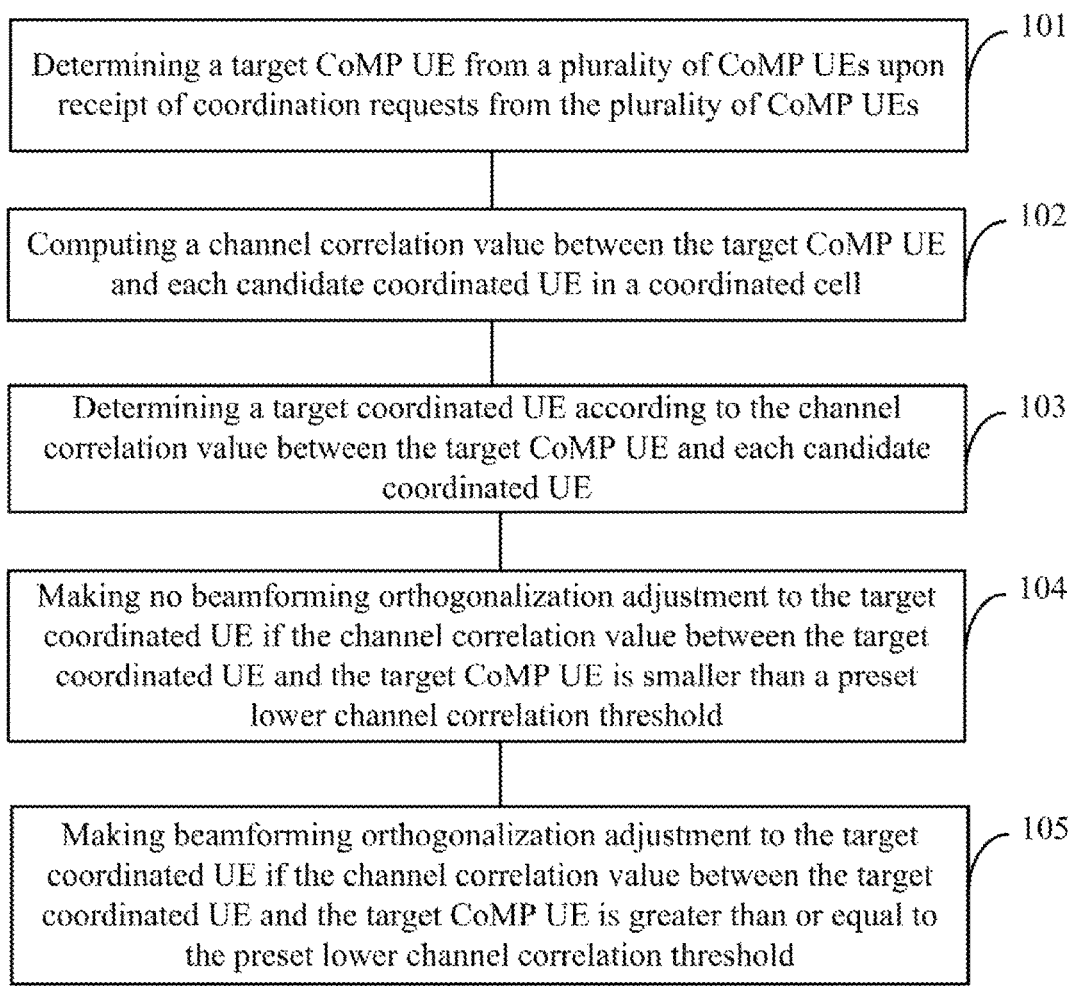
FIG. 1 is a flowchart of a coordinated beamforming method according to a first embodiment of the application.

As shown in FIG. 1, a flowchart of a coordinated beamforming method according to a first embodiment of the application is provided, and the method may include the following operations.

Operation 101, determining a target CoMP UE from a plurality of CoMP UEs upon receipt of coordination requests from the plurality of the CoMP UEs.

Operation 102, computing a channel correlation value between the target CoMP UE and each candidate coordinated UE in a coordinated cell.

Operation 103, determining a target coordinated UE according to the channel correlation value between the target CoMP UE and each candidate coordinated UE.

Operation 104, making no beamforming orthogonalization adjustment to the target coordinated UE if the channel correlation value between the target coordinated UE and the target CoMP UE is smaller than a preset lower channel correlation threshold.

Operation 105, making beamforming orthogonalization adjustment to the target coordinated UE if the channel correlation value between the target coordinated UE and the target CoMP UE is greater than or equal to the preset lower channel correlation threshold.

In the embodiment of the application, the coordinated cell may determine one CoMP UE as the target CoMP UE from a plurality of CoMP UEs when receiving coordination requests of a plurality of CoMP UEs, thereby avoiding the conflict caused by the simultaneous requests for coordination by a plurality of CoMP UEs.

In addition, after the target coordinated UE is determined in the embodiment of the application, whether beamforming orthogonalization adjustment needs to be made to the target coordinated UE is determined according to the channel correlation value between the target coordinated UE and the target CoMP UE; if the channel correlation value between the target coordinated UE and the target CoMP UE is smaller than the preset lower channel correlation threshold, no beamforming orthogonalization adjustment will be made to the target coordinated UE; otherwise, beamforming orthogonalization adjustment will be made to the target coordinated UE, so that the performance of the target coordinated UE will not decline, thereby greatly reducing the probability for the performance reduction of the target coordinated UE.

Figure 2:
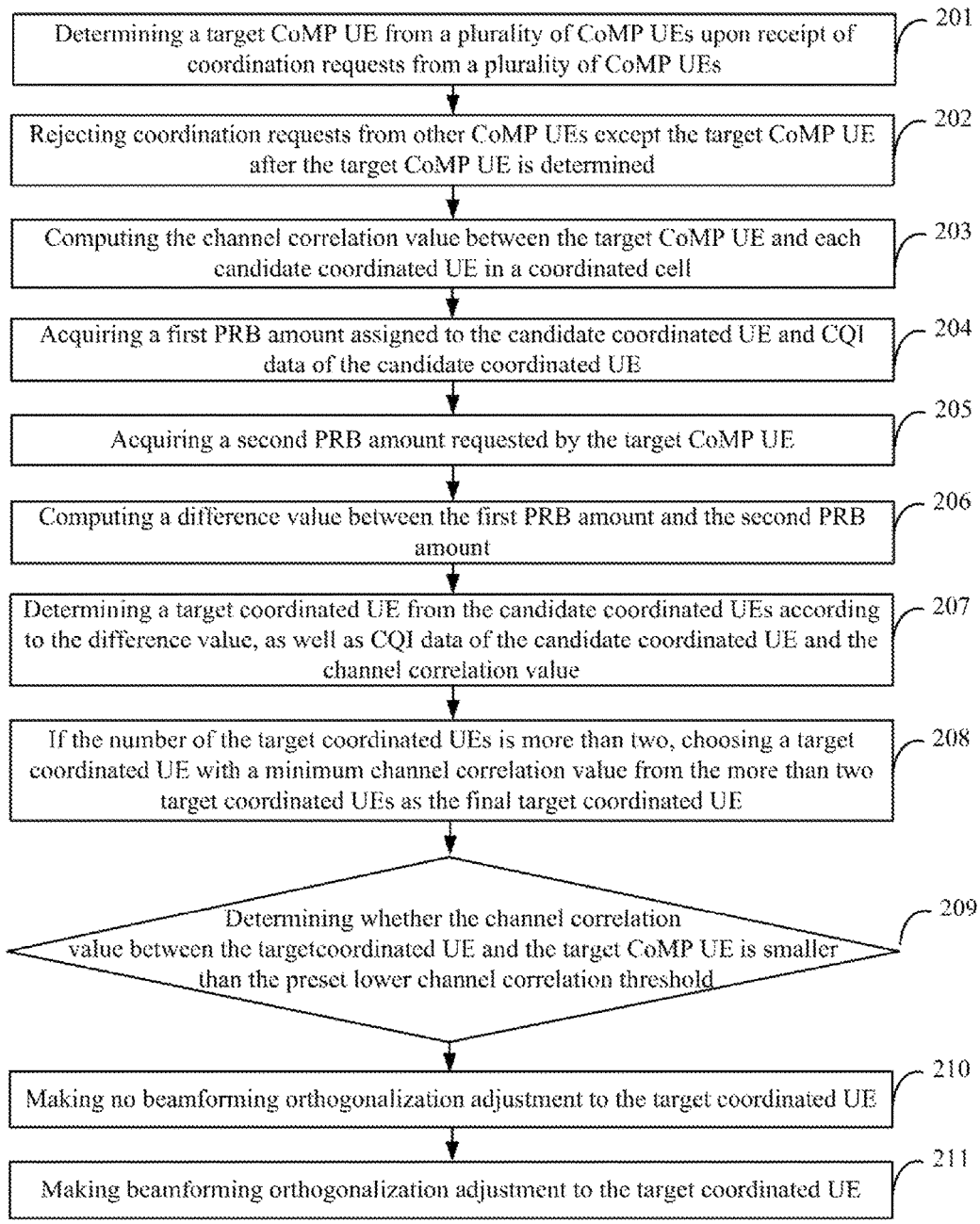
FIG. 2 is a flowchart of a coordinated beamforming method according to a second embodiment of the application.

As shown in FIG. 2, a flowchart of a coordinated beamforming method according to a second embodiment of the application is provided; and the method may include the following operations.

Operation 201, determining a target CoMP UE from a plurality of CoMP UEs upon receipt of coordination requests from a plurality of CoMP UEs.

In the coordinated beamforming technology, UE performs A3 event and triggers the selection of CoMP UE for the purpose of determining a UE near the cell edge with a lower Signal to Interference plus Noise Ratio (SINR) as the CoMP UE, and enabling the UE to acquire coordinated beamforming gain.

The CoMP UE is selected by the serving cell according to the difference value between the Reference Signal Received Power (RSRP) of the serving cell and the RSRP of an adjacent cell and the Channel Quality Indicator (CQI) of a UE; in other words, whether the CQI data of a UE reporting an A3 event is smaller than a preset threshold is determined; if so, the UE is determined as a CoMP UE; otherwise, the UE is determined as an ordinary UE. Where the CQI refers to a value (or a plurality of values) which can represent the communication quality of a specified radio channel; the higher the CQI value, the higher the channel quality. CQI data of a channel can be computed using performance indicators like SNR (Signal to Noise Ratio), SINR (Signal to Interference plus Noise Ratio), and SNDR (Signal to Noise Distorsion Ratio) etc.

The UE will also report RSRP values of a plurality of adjacent cells based on A3 event, so after determining the CoMP UE, the serving cell of the CoMP UE may also take one or a plurality of adjacent cells, of which the absolute value of the RSRP difference value from the serving cell of the CoMP UE has reached the preset threshold value, as a candidate coordinated cell; a plurality of coordinated cells corresponding to one CoMP UE can form a candidate coordinated cell set. After determining a coordinated cell from the candidate coordinated cell set, the serving cell of the CoMP UE may send a coordination request to the coordinated cell, so that the CoMP UE acquires the coordinated beamforming gain from the coordinated cell.

It shall be noted that the coordinated cell and serving cell may belong to the same base station or different base stations, but the embodiment of the application will not be limited thereto.

As a preferred case of the embodiment of the application, the coordination request may include CQI data of the CoMP UE, SRS configuration information and scheduling information, and the like.

A coordinated cell may possibly receive coordination requests of a plurality of CoMP UEs sent by a plurality of serving cells within the same subframe period, and the resources of Physical Resource Blocks (PRBs) of the requested by the plurality of CoMP UEs are overlapped, so the coordinated cell can determine one target CoMP UE from the plurality of CoMP UEs. In a preferred embodiment of the application, operation 201 may include the following sub-operations.

Sub-operation S11, comparing CQI data of a plurality of CoMP UEs and taking the CoMP UE with a minimum CQI data as the target CoMP UE.

After a coordinated cell acquires the CQI data of a plurality of CoMP UEs from the coordination requests, the coordinated cell will compare the multiple CQI data. CQI may reflect the channel quality; the smaller the CQI, the poorer the channel quality, the bigger the interference received, and the bigger the demand for coordination; therefore, in the embodiment of the application, the CoMP UE with the minimum CQI data is taken as the target CoMP UE, from which the coordination request is received by the coordinated cell in the current subframe period.

Operation 202, rejecting coordination requests from other CoMP UEs except the target CoMP UE after the target CoMP UE is determined.

In the embodiment of the application, in order to avoid the conflict caused by the requests for coordination of a plurality of CoMP UEs simultaneously, after the target CoMP UE is determined, the coordination requests sent by the other CoMP UEs except the target CoMP UE will be rejected.

Operation 203, computing the channel correlation value between the target CoMP UE and each candidate coordinated UE in a coordinated cell.

After determining the target CoMP UE from a plurality of CoMP UEs, the coordinated cell can further compute the channel correlation value between the target CoMP UE and each UE (namely the candidate coordinated UE) in the cell, where the channel correlation value is used to describe the correlation of channel information between two UEs.

In a preferred embodiment of the application, operation 203 may include the following sub-operations.

Sub-operation S21, acquiring the channel information of the target CoMP UE, and the channel information of each candidate coordinated UE in the coordinated cell.

The coordinated cell may estimate the corresponding channel information according to SRS of the target CoMP UE and SRS of each candidate coordinated UE in the coordinated cell; specifically, channel information of the target CoMP UE may be computed using the channel estimation algorithm according to the uplink SRS configuration information of CoMP UE reported by CoMP UE to the coordinated cell, and the channel reciprocity; channel information of each candidate coordinated UE in the coordinated cell may be computed using the channel estimation algorithm according to the uplink SRS of the UE reported by each candidate coordinated UE, and channel reciprocity.

Sub-operation S22, computing the channel correlation value between the target CoMP UE and each candidate coordinated UE according to the channel information of the target CoMP UE and the channel information of each candidate coordinated UE.

After the channel information of the target CoMP UE and the channel information of each candidate coordinated UE in the coordinated cell are acquired, the channel correlation value between the target CoMP UE and each candidate coordinated UE may be computed according to the two types of channel information.

In one implementation, channel information may include the channel response value (namely, channel estimation matrix), and the channel correlation value may be computed according to the channel response value. For example, the following formula may be adopted to compute the channel correlation value between the target CoMP UE and each candidate coordinated UE (assuming that the target CoMP UE is represented by UE j, and the candidate coordinated UE is represented by UE i).

$$ChCor_{i,j} = \frac{1}{N_{sc}} \sum_{k=0}^{N_{sc}-1} \frac{H_{i,k}^H \cdot H_{j,k}}{\|H_{i,k}^H\| \cdot \|H_{j,k}\|}$$

Where $ChCor_{i,j}$ represents the channel correlation value between the UE i and the UE j; $H_{i,k}$ represents the channel response value of UE i on the subcarrier k; $H_{j,k}$ represents the channel response value of UE j on the subcarrier k; $N_{sc}$ represents the number of subcarriers within the coordinated bandwidth; $H_{i,k}^H$ represents the conjugate transpose matrix of $H_{i,k}$.

In another implementation, the channel correlation value may be computed according to the beamforming vector. For example, the following formula may be adopted to compute the channel correlation value between the target CoMP UE and each candidate coordinated UE (assuming that the target CoMP UE is represented by UE j, and the candidate coordinated UE is represented by UE i).

$$ChCor_{i,j} = V_i^H \cdot V_j$$

where $ChCor_{i,j}$ represents the channel correlation value between UE i and UE j; $V_i$ represents the beamforming vector of UE i; $V_j$ represents the beamforming vector of UE j; $V_i^H$ represents the conjugate transpose matrix of $V_i$.

It shall be noted that the two methods for computing the channel correlation value are only an example of the embodiment of the application. Those skilled in the art may also adopt other mode to compute the channel correlation value of two UEs, and the embodiment of the application will not be limited thereto.

Operation 204, acquiring a first PRB amount assigned to the candidate coordinated UE and CQI data of the candidate coordinated UE.

Specifically, the CQI data of the candidate coordinated UE is reported by the candidate coordinated UE to the coordinated cell. The PRB amount assigned to the candidate coordinated UE may be determined based on the data volume to be transmitted by the candidate coordinated UE using L2 scheduler according to scheduling algorithm.

Operation 205, acquiring a second PRB amount requested by the target CoMP UE.

In reality, scheduling information sent by the target CoMP UE to the coordinated cell may include the PRB amount of the target CoMP UE (namely, the second PRB amount). In a serving cell, the second PRB amount requested by the target CoMP UE may be determined based on the data volume to be transmitted by the target CoMP UE using L2 scheduler according to scheduling algorithm.

Operation 206, computing a difference value between the first PRB amount and the second PRB amount.

After acquiring the first PRB amount of each candidate coordinated UE in the coordinated cell, and acquiring the second PRB amount of the target CoMP UE, the coordinated cell may further compute the difference value between the first PRB amount and the second PRB amount as one of the factors for determining the target coordinated UE later.

Operation 207, determining a target coordinated UE from the candidate coordinated UEs according to the difference value, as well as CQI data of the candidate coordinated UE and the channel correlation value.

In the embodiment of the application, the candidate coordinated UE meeting the following three conditions at the same time in the coordinated cell may be taken as the target coordinated UE.

(1) Channel correlation value of the target CoMP UE and the candidate coordinated UE is smaller than or equal to s preset upper channel correlation threshold.

(2) CQI data of the candidate coordinated UE is greater than or equal to s preset CQI threshold.

(3) The difference value between the first PRB amount and the second PRB amount is smaller than a preset PRB difference threshold.

Specifically, in order to determine the target coordinated UE from a plurality of candidate coordinated UEs, three threshold values may be set in the embodiment of the application, namely, an upper channel correlation threshold, a CQI threshold and a PRB difference threshold. When the channel correlation value between a candidate coordinated UE and the target CoMP UE meets the upper channel correlation threshold, CQI value of the candidate coordinated UE meets the CQI threshold, and the difference value between the first PRB amount of the candidate coordinated UE and the second PRB amount of the target CoMP UE meets the difference threshold, the candidate coordinated UE may be taken as the target coordinated UE.

It shall be noted that those skilled in the art may set the specific value of the three threshold values according to practical experience, and no restriction is set in the embodiment of the application.

Operation 208, if the number of the target coordinated UEs is more than two, choosing a target coordinated UE with a minimum channel correlation value from the more than two target coordinated UEs as the final target coordinated UE.

In the embodiment of the application, when more than one target coordinated UEs are determined in operation 207, a second determination may be made according to the channel correlation value between more than two target coordinated UEs and the target CoMP UE, and the target coordinated UE with the minimum channel correlation value will be selected from more than two target coordinated UEs as the final target coordinated UE.

Operation 209, determining whether the channel correlation value between the target coordinated UE and the target CoMP UE is smaller than the preset lower channel correlation threshold; if so, operation 210 shall be performed; if not, operation 211 shall be performed.

In the embodiment of the application, when the coordinated cell determines the target coordinated UE, the coordinated cell shall perform operation 209 and further determine whether beamforming orthogonalization adjustment needs to be made according to the channel correlation value. Here a lower channel correlation threshold is set in the embodiment of the application for determination.

It shall be noted that those skilled in the art may set the specific value of the lower channel correlation threshold according to practical experience, and no restriction is set in the embodiment of the application.

Operation 210, making no beamforming orthogonalization adjustment to the target coordinated UE.

If the channel correlation value between the target coordinated UE and the target CoMP UE is smaller than the preset lower channel correlation threshold, no beamforming orthogonalization adjustment needs to be made to the target coordinated UE.

Simulation data show that when the channel correlation between the target CoMP UE and the target coordinated UE is very low, after a comparison is made between adjustment to the beam of the target coordinated UE and no adjustment to the beam of the target coordinated UE, performance of the target CoMP UE is found to have no obvious change. Therefore, if the channel correlation between CoMP UE and the coordinated UE is very low (lower than the preset lower channel correlation threshold), in the embodiment of the application, beamforming vector of the coordinated UE will not be adjusted. In this way, performance of the target coordinated UE will not be reduced.

Operation 211, making beamforming orthogonalization adjustment to the target coordinated UE.

If the channel correlation value between the target coordinated UE and the target CoMP UE is greater than or equal to the preset lower channel correlation threshold, beamforming orthogonalization adjustment needs to be made to the target coordinated UE, so that the shaped-beam of the target coordinated UE being adjustd is kept orthogonal with the virtual shaped-beam of the target CoMP UE in the coordinated cell.

In reality, those skilled in the art may adopt any existing beamforming orthogonalization adjustment algorithm, such as Gram-Schmidt orthogonalization algorithm or Zero Forcing (ZF) algorithm, and no restriction is set in the embodiment of the application.

In the embodiment of the application, when the coordinated cell determines more than two target coordinated UEs from a plurality of candidate coordinated UEs, a second determination may be made according to the channel correlation value between more than two target coordinated UEs and the target CoMP UE, and the target coordinated UE with the minimum channel correlation value will be selected from more than two target coordinated UEs as the final target coordinated UE, thereby improving the accuracy of determination of the target coordinated UE.

It shall be noted that for the embodiments of the method, the embodiments are represented as combinations of actions for the purpose of simplifying the description, but those skilled in the art shall be acquainted that embodiments of the application are not restricted by the sequence of the actions described, because according to the embodiments of the application, some operations may adopt other sequence or be performed simultaneously. Secondly, those skilled in the art shall also be acquainted that the embodiments described in the specification all belong to preferred embodiments, and the actions involved may not always be required in the embodiments of the application.

Figure 3:
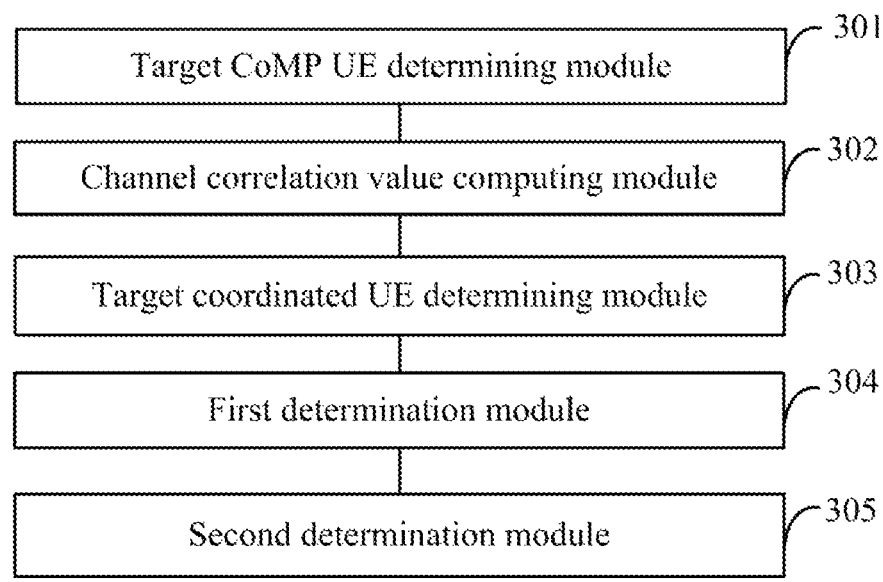
FIG. 3 is a structure diagram of a coordinated beamforming device according to an embodiment of the application.

As shown in FIG. 3, the structure diagram of a coordinated beamforming device according to an embodiment of the application is provided; specifically, the device may include: a target CoMP UE determining module 301 configured to determine a target CoMP UE from a plurality of CoMP UEs upon receipt of a coordination requests from the plurality of CoMP UEs; a channel correlation value computing module 302 configured to compute the channel correlation value between the target CoMP UE and each candidate coordinated UE in a coordinated cell; a target coordinated UE determining module 303 configured to determine a target coordinated UE according to the channel correlation value between the target CoMP UE and each candidate coordinated UE; a first determination module 304 configured to make no beamforming orthogonalization adjustment to the target coordinated UE if the channel correlation value between the target coordinated UE and the target CoMP UE is smaller than a preset lower channel correlation threshold; and a second determination module 305 configured to make beamforming orthogonalization adjustment to the target coordinated UE if the channel correlation value between the target coordinated UE and the target CoMP UE is greater than or equal to the preset lower channel correlation threshold.

In a preferred embodiment of the application, the device further includes: a request rejection module configured to reject coordination requests from other CoMP UEs except the target CoMP UE after the target CoMP UE is determined.

In a preferred embodiment of the application, the coordination requests include CQI data of the CoMP UEs; and the target CoMP UE determining module 301 may include the following module: a CoMP UE selection module configured to compare the CQI data of the plurality of CoMP UEs and take a CoMP UE with a minimum CQI data as the target CoMP UE.

In a preferred embodiment of the application, the channel correlation value computing module 302 may include the following modules: a channel information acquiring module configured to acquire channel information of the target CoMP UE, and channel information of each candidate coordinated UE in a coordinated cell; and a computing module configured to compute the channel correlation value between the target CoMP UE and each candidate coordinated UE according to the channel information of the target CoMP UE and the channel information of each candidate coordinated UE.

In a preferred embodiment of the application, the target coordinated UE determining module 303 may include the following modules: a candidate coordinated UE data acquiring module configured to acquire a first Physical Resource Block (PRB) amount assigned to the candidate coordinated UE and CQI data of the candidate coordinated UE; a target CoMP UE data acquiring module configured to acquire a second PRB amount requested by the target CoMP UE; a difference value computing module configured to compute a difference value between the first PRB amount and the second PRB amount; and a determination module configured to take a candidate coordinated UE meeting the following three conditions at the same time in the coordinated cell as the target coordinated UE.

(1) Channel correlation value of the target CoMP UE and the candidate coordinated UE is smaller than or equal to s preset upper channel correlation threshold.

CQI data of the candidate coordinated UE is greater than or equal to s preset CQI threshold.

The difference value between the first PRB amount and the second PRB amount is smaller thans preset PRB difference threshold.

In a preferred embodiment of the application, the target coordinated UE determining module 303 is further configured to: choose a target coordinated UE with the minimum channel correlation value from the more than two target coordinated UEs as the final target coordinated UE if the number of the target coordinated UEs is more than two.

The device embodiments are simply described, because the device embodiments are basically similar to the method embodiments; the relevant parts may be referred to the descriptions of the method embodiments.

The embodiment of the application further discloses a computer readable storage medium storing programs used to perform the aforementioned method.

The computer readable storage medium includes any mechanism which is used to store or transfer information in the form of computer readable (such as a computer). For example, the machine-readable medium includes read-only memory (ROM), random access memory (RAM), disk memory medium, optical memory medium, flash memory medium, and electrical, optical, and acoustic or other forms of propagation signals (such as carrier signal, infrared signal and digital signal), and the like.

Embodiments in the specifications are described in a progressive way. Emphases on the description of each embodiment are the part different from the other embodiments. The same or similar parts of the embodiments may be referred to mutually.

Those of skill in the art shall understand the embodiment of the application may include a method, a device or a computer program product. Therefore, the embodiment of the application may be represented with only hardware, or with only software, or with a combination of software and hardware. Besides, the embodiment of the application may also adopt the computer program product performed on one or a plurality of computer useable memory mediums (including, but not limited to disk memory, CD-ROM, optical memory, and the like) which comprise a computer useable program code.

The embodiments of the application are described with reference to the flowchart and/or block diagram of the method, terminal equipment (system) and computer program product of the embodiment. What needs to be understood is that the computer program command may perform each flow and/or block of the flowchart and/or the block diagram, or the combination of each flow and/or block of the flowchart and/or the block diagram. A processor from the computer program commands to an all-purpose computer, dedicated computer, embedded processor or other programmable data processing terminal equipment may be provided to produce a machine, so that the commands executed by the processor of a computer or other programmable data processing terminal equipment may generate a device which is used to realize the specified functions of one or a plurality of flows of the flowchart and/or one or a plurality of blocks of the block diagram.

These computer program commands may also be stored in a computer-readable memory which may guide the computer or other programmable data processing terminal equipment to work in a specified way, so that the commands stored in the computer-readable memory may produce a product which includes the command device. The command device may realize the functions specified in one or a plurality of flows of the flowchart and/or one or a plurality of blocks of the block diagram.

These computer program commands may also be loaded to a computer or other programmable data processing terminal equipment, so that a series of operations may be executed by the computer or other programmable terminal equipment to realize computer processing, so that the command executed by the computer or other programmable terminal equipment may provide the operations for realizing the functions in one or a plurality of flows of the flowchart and/or one or a plurality of blocks of the block diagram.

Although the preferred embodiments of the application are described, those of skill in the art may make changes and modifications to these embodiments once a basic creative concept is acquired. Therefore, the claims attached shall be deemed to include the preferred embodiments and all changes and modifications of the embodiments of the application.

Finally, it shall be noted that the relational terms such as "a first and a second" hereof are only used to differentiate one entity or operation from another entity or operation, and may not specify or suggest that such relationship or sequence exists between these entities or operations. Besides, the term "include" or "comprise" or any other variants is non-exclusive, so that the process, method, item or terminal equipment which include a series of elements may also include other elements not having been listed or the elements inherent to such process, method, item or terminal equipment. Without further restriction, the process, method, item or terminal equipment which include the element determinative by the phrase "include(s) a . . . " may also comprise other same elements.

Detailed introductions are given to a coordinated beamforming method and device provided in the embodiments of the application hereinbefore. Specific cases are adopted to describe the principle and detailed description of the embodiment of the application. Descriptions of the embodiments only help to understand the method and core thought of the embodiments of the application; in the meanwhile, for those skilled in the art, according to the thought of the application, changes may happen to the detailed description of the embodiments and scope of application. In conclusion, contents of the application shall not be understood as restriction of the application.

The invention claimed is:

1. A coordinated beamforming method, wherein the method comprising:
   determining one target Coordinated Multiple Points, CoMP, User Equipment, UE, from a plurality of CoMP UEs upon receipt of coordination requests from the plurality of CoMP UEs;
   rejecting coordination requests from other CoMP UEs except for the one target CoMP UE after the one target CoMP UE is determined;
   computing a channel correlation value between the one target CoMP UE and each candidate coordinated UE in a coordinated cell;
   determining a target coordinated UE according to the channel correlation value between the one target CoMP UE and each candidate coordinated UE;
   making no beamforming orthogonalization adjustment to the target coordinated UE when the channel correlation value between the target coordinated UE and the one target CoMP UE is smaller than a preset lower channel correlation threshold; and
   making beamforming orthogonalization adjustment to the target coordinated UE when the channel correlation value between the target coordinated UE and the one target CoMP UE is greater than or equal to the preset lower channel correlation threshold.

2. The method according to claim 1, wherein the coordination requests comprise Channel Quality Indicator, CQI, data of the CoMP UEs; and the determining the one target CoMP UE from the plurality of CoMP UEs upon receipt of coordination requests from the plurality of CoMP UEs comprises:
   comparing the CQI data of the plurality of CoMP UEs and taking a CoMP UE with a minimum CQI data as the one target CoMP UE.

3. The method according to claim 1, wherein the computing the channel correlation value between the one target CoMP UE and each candidate coordinated UE in the coordinated cell comprises:
   acquiring channel information of the one target CoMP UE, and channel information of each candidate coordinated UE in the coordinated cell; and
   computing the channel correlation value between the one target CoMP UE and each candidate coordinated UE according to the channel information of the one target CoMP UE and the channel information of each candidate coordinated UE.

4. The method according to claim 1, wherein the determining the target coordinated UE according to the channel correlation value between the one target CoMP UE and each candidate coordinated UE comprises:
   acquiring a first Physical Resource Block, PRB, amount distributed to the candidate coordinated UE and CQI data of the candidate coordinated UE;
   acquiring a second PRB amount requested by the one target CoMP UE;
   computing a difference value between the first PRB amount and the second PRB amount; and
   taking a candidate coordinated UE meeting following three conditions at the same time in the coordinated cell as the target coordinated UE:
   (1) Channel correlation value of the one target CoMP UE and the candidate coordinated UE is smaller than or equal to a preset upper channel correlation threshold;
   (2) CQI data of the candidate coordinated UE is greater than or equal to a preset CQI threshold;
   (3) The difference value between the first PRB amount and the second PRB amount is smaller than a preset PRB difference threshold.

5. The method according to claim 4, wherein the determining the target coordinated UE according to the channel correlation value between the one target CoMP UE and each candidate coordinated UE further comprises:
   when the number of the target coordinated UEs is more than two, choosing a target coordinated UE with a minimum channel correlation value from the more than two target coordinated UEs as a final target coordinated UE.

6. The method according to claim 1, wherein the coordination requests comprise Channel Quality Indicator, CQI, data of the CoMP UEs; and the determining the one target CoMP UE from the plurality of CoMP UEs upon receipt of coordination requests from the plurality of CoMP UEs comprises:
   comparing the CQI data of the plurality of CoMP UEs and taking a CoMP UE with a minimum CQI data as the one target CoMP UE.

7. The method according to claim 3, wherein the determining the target coordinated UE according to the channel correlation value between the one target CoMP UE and each candidate coordinated UE comprises:
   acquiring a first Physical Resource Block, PRB, amount distributed to the candidate coordinated UE and CQI data of the candidate coordinated UE;
   acquiring a second PRB amount requested by the one target CoMP UE;

computing a difference value between the first PRB amount and the second PRB amount; and taking a candidate coordinated UE meeting following three conditions at the same time in the coordinated cell as the target coordinated UE:
(1) Channel correlation value of the one target CoMP UE and the candidate coordinated UE is smaller than or equal to a preset upper channel correlation threshold;
(2) CQI data of the candidate coordinated UE is greater than or equal to a preset CQI threshold;
(3) The difference value between the first PRB amount and the second PRB amount is smaller than a preset PRB difference threshold.

8. A coordinated beamforming device, wherein the device comprising a memory storing preset program codes and at least one processor; wherein the at least one processor is configured to execute the preset program codes to:

determine one target CoMP UE from a plurality of CoMP UEs upon receipt of coordination requests from the plurality of CoMP UEs;

reject coordination requests from other CoMP UEs except for the one target CoMP UE after the one target CoMP UE is determined;

compute a channel correlation value between the one target CoMP UE and each candidate coordinated UE in a coordinated cell;

determine a target coordinated UE according to the channel correlation value between the one target CoMP UE and each candidate coordinated UE;

make no beamforming orthogonalization adjustment to the target coordinated UE when the channel correlation value between the target coordinated UE and the one target CoMP UE is smaller than a preset lower channel correlation threshold; and make beamforming orthogonalization adjustment to the target coordinated UE when the channel correlation value between the target coordinated UE and the one target CoMP UE is greater than or equal to the preset lower channel correlation threshold.

9. The device according to claim 8, wherein the coordination requests comprise CQI data of the CoMP UEs, and the at least one processor is further configured to execute the preset program codes to:

compare the CQI data of the plurality of CoMP UEs and take a CoMP UE with a minimum CQI data as the one target CoMP UE.

10. The device according to claim 8, wherein the at least one processor is further configured to execute the preset program codes to:

acquire channel information of the one target CoMP UE, and channel information of each candidate coordinated UE in the coordinated cell; and compute the channel correlation value between the one target CoMP UE and each candidate coordinated UE according to the channel information of the one target CoMP UE and the channel information of each candidate coordinated UE.

11. The device according to claim 8, wherein the at least one processor is further configured to execute the preset program codes to:

acquire a first Physical Resource Block, PRB, amount assigned to the candidate coordinated UE and CQI data of the candidate coordinated UE;

acquire a second PRB amount requested by the one target CoMP UE;

compute a difference value between the first PRB amount and the second PRB amount; and take a candidate coordinated UE meeting following three conditions at the same time in the coordinated cell as the target coordinated UE:
(1) Channel correlation value of the one target CoMP UE and the candidate coordinated UE is smaller than or equal to a preset upper channel correlation threshold;
(2) CQI data of the candidate coordinated UE is greater than or equal to a preset CQI threshold;
(3) The difference value between the first PRB amount and the second PRB amount is smaller than a preset PRB difference threshold.

12. The device according to claim 11, wherein the at least one processor is further configured to execute the preset program codes to:

choose a target coordinated UE with a minimum channel correlation value from more than two target coordinated UEs as a final target coordinated UE when the number of the target coordinated UEs is more than two.

13. The device according to claim 8, wherein the coordination requests comprise CQI data of the CoMP UEs, and the at least one processor is further configured to execute the preset program codes to:

compare the CQI data of the plurality of CoMP UEs and take a CoMP UE with a minimum CQI data as the one target CoMP UE.

14. The device according to claim 10, wherein the at least one processor is further configured to execute the preset program codes to:

acquire a first Physical Resource Block, PRB, amount assigned to the candidate coordinated UE and CQI data of the candidate coordinated UE;

acquire a second PRB amount requested by the one target CoMP UE;

compute a difference value between the first PRB amount and the second PRB amount; and take a candidate coordinated UE meeting following three conditions at the same time in the coordinated cell as the target coordinated UE:
(1) Channel correlation value of the one target CoMP UE and the candidate coordinated UE is smaller than or equal to a preset upper channel correlation threshold;
(2) CQI data of the candidate coordinated UE is greater than or equal to a preset CQI threshold;
(3) The difference value between the first PRB amount and the second PRB amount is smaller than a preset PRB difference threshold.

15. A non-transitory computer readable storage medium storing programs used to perform the method according to claim 1.

* * * * *